(12) United States Patent
Rault

(10) Patent No.: US 7,606,305 B1
(45) Date of Patent: Oct. 20, 2009

(54) METHOD AND SYSTEM FOR TRANSCODING VIDEO DATA

(75) Inventor: Patrick Rault, Toronto (CA)

(73) Assignee: VIXS Systems, Inc., Toronto (CA)

( * ) Notice: Subject to any disclaimer, the term of this patent is extended or adjusted under 35 U.S.C. 154(b) by 1122 days.

(21) Appl. No.: 10/375,166

(22) Filed: Feb. 24, 2003

(51) Int. Cl.
*H04N 7/12* (2006.01)

(52) U.S. Cl. .............. 375/240.12; 375/240; 375/240.01

(58) Field of Classification Search .............. 375/240.2, 375/240, 240.01, 240.03, 240.13, 240.23, 375/240.12
See application file for complete search history.

(56) References Cited

U.S. PATENT DOCUMENTS

| | | |
|---|---|---|
| 4,866,395 A | 9/1989 | Hosteller |
| 5,027,203 A | 6/1991 | Samad et al. |
| 5,093,847 A | 3/1992 | Cheng |
| 5,115,812 A | 5/1992 | Sano et al. |
| 5,253,056 A | 10/1993 | Puri |
| 5,475,434 A | 12/1995 | Kim |
| 5,563,950 A | 10/1996 | Easter et al. |
| 5,602,589 A | 2/1997 | Vishwanath et al. |
| 5,635,985 A | 6/1997 | Boyce et al. |
| 5,644,361 A | 7/1997 | Ran et al. |
| 5,652,749 A | 7/1997 | Davenport et al. |
| 5,732,391 A | 3/1998 | Fiocca |
| 5,737,020 A | 4/1998 | Hall et al. |
| 5,740,028 A | 4/1998 | Sugiyama et al. |
| 5,844,545 A | 12/1998 | Suzuki et al. |
| 5,850,443 A | 12/1998 | Van Oorschot et al. |
| 5,940,130 A | 8/1999 | Nilsson et al. |
| 5,996,029 A | 11/1999 | Sugiyama et al. |
| 6,005,623 A | 12/1999 | Takahashi et al. |
| 6,005,624 A | 12/1999 | Vainsencher |
| 6,014,694 A | 1/2000 | Aharoni et al. |
| 6,037,985 A | 3/2000 | Wong |
| 6,040,863 A | 3/2000 | Kato |
| 6,081,295 A | 6/2000 | Adolph et al. |
| 6,141,693 A | 10/2000 | Perlman et al. |
| 6,144,402 A | 11/2000 | Norsworthy et al. |
| 6,167,084 A | 12/2000 | Wang et al. |
| 6,182,203 B1 | 1/2001 | Simar, Jr. et al. |

(Continued)

FOREIGN PATENT DOCUMENTS

EP   0661826 A2   7/1995

(Continued)

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

(Continued)

*Primary Examiner*—Allen Wong

(57) ABSTRACT

A first method of transcoding video data is disclosed that generates a motion vector for a macroblock encoded as a dual prime macro block that has a direct motion vector, and differential motion vector for its two fields respectively. Another method of transcoding includes replacing a skipped P-macroblock that has been used to backward predict a B-Frame with a P-macroblock having a motion vector of zero. Another method of transcoding includes replacing a skipped B-Macroblock with a macroblock having a motion vector from a macroblock of the same frame of the skipped B-Macroblock that is not co-located.

18 Claims, 11 Drawing Sheets

U.S. PATENT DOCUMENTS

| | | | |
|---|---|---|---|
| 6,215,821 B1 | 4/2001 | Chen | |
| 6,219,358 B1 | 4/2001 | Pinder et al. | |
| 6,222,886 B1 | 4/2001 | Yogeshwar | |
| 6,236,683 B1 | 5/2001 | Mougeat et al. | |
| 6,259,741 B1 | 7/2001 | Chen et al. | |
| 6,263,022 B1 | 7/2001 | Chen et al. | |
| 6,300,973 B1 | 10/2001 | Feder et al. | |
| 6,307,939 B1 | 10/2001 | Vigarie | |
| 6,314,138 B1 | 11/2001 | Lemaguet | |
| 6,323,904 B1 | 11/2001 | Knee | |
| 6,366,614 B1 | 4/2002 | Pian et al. | |
| 6,385,248 B1 | 5/2002 | Pearlstein et al. | |
| 6,438,168 B2 | 8/2002 | Arye | |
| 6,480,541 B1 | 11/2002 | Girod et al. | |
| 6,526,099 B1 | 2/2003 | Chistopoulos et al. | |
| 6,549,561 B2 | 4/2003 | Crawford | |
| 6,574,279 B1 * | 6/2003 | Vetro et al. | 375/240.23 |
| 6,584,509 B2 | 6/2003 | Putzolu | |
| 6,625,320 B1 | 9/2003 | Nilsson et al. | |
| 6,647,061 B1 | 11/2003 | Panusopone et al. | |
| 6,714,202 B2 | 3/2004 | Dorrell | |
| 6,724,726 B1 | 4/2004 | Coudreuse | |
| 6,748,020 B1 | 6/2004 | Eifrig et al. | |
| 6,904,094 B1 * | 6/2005 | Liu et al. | 375/240.13 |
| 6,940,906 B2 | 9/2005 | Takahashi et al. | |
| 6,990,146 B2 | 1/2006 | Chen | |
| 6,999,512 B2 * | 2/2006 | Yoo et al. | 375/240.03 |
| 7,123,772 B2 | 10/2006 | Estevez et al. | |
| 2001/0026591 A1 | 10/2001 | Keren et al. | |
| 2002/0106022 A1 | 8/2002 | Takahashi et al. | |
| 2002/0110193 A1 | 8/2002 | Kyoon et al. | |
| 2002/0138259 A1 | 9/2002 | Kawahara | |
| 2002/0145931 A1 | 10/2002 | Pitts | |
| 2002/0196851 A1 | 12/2002 | Arnaud | |
| 2003/0044080 A1 | 3/2003 | Frishman et al. | |
| 2003/0093661 A1 | 5/2003 | Loh et al. | |
| 2003/0128885 A1 | 7/2003 | Zhou | |
| 2003/0152148 A1 | 8/2003 | Laksono | |
| 2004/0179597 A1 | 9/2004 | Rault | |
| 2006/0050784 A1 | 3/2006 | Lappalainen et al. | |

FOREIGN PATENT DOCUMENTS

| | | | |
|---|---|---|---|
| EP | 0739138 A2 | 10/1996 | |
| EP | 0805599 A2 | 11/1997 | |
| EP | 0855805 A2 | 7/1998 | |
| EP | 0896300 B1 | 2/1999 | |
| EP | 0901285 A1 | 2/1999 | |
| EP | 0955607 A2 | 11/1999 | |
| EP | 1032214 A2 | 8/2000 | |
| EP | 1087625 A2 | 3/2001 | |
| JP | 07-210670 A | 8/1995 | |
| WO | WO 01/95633 A2 | 12/2001 | |
| WO | WO 02/080518 A2 | 10/2002 | |

OTHER PUBLICATIONS

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG20030615S0070> retrieved Jul. 8, 2003.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Aggarwal, Manoj et al., "Efficient Huffman Decoding," 2000 IEEE, 0-7803-6297-7, pp. 936-939, University of Illinois at Urbana-Champaign, Urbana, IL.

Assuncao, Pedro et al., "Rate Reduction Techniques for MPEG-2 Video Bit Streams," SPIE, Vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al.,"On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions on Circuits and Systems for Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014, Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Liu, Julia J., "ECE497KJ Course Project: Applications of Wiener Filtering In Image and Video De-Noising," pp. 1-15, May 21, 1997.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing. Vancouver, Canada.

Tourapis, Alexis et al. "New Results on Zonal Based Motion Estimation Algorithms—Advanced Predictive Diamond Zonal Search," 2001 IEEE, pp. V 183-V 186, the Hong Kong University of Science and Technology, Clear Water Bay, Kowloon, Hong Kong.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"Ice Fyre Semiconductor: IceFyre 5-GHz OFDM Modem Solution," Sep. 2001, pp. 1-6, Icefyre: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE. pp. 1-83, Supplement to IEEE Standard to rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

METHOD AND SYSTEM FOR TRANSCODING VIDEO DATA

CROSS-REFERENCE TO RELATED APPLICATION(S)

A copending application exists having Ser. No. 10/375,725, entitled "METHOD AND SYSTEM FOR TRANSCODING VIDEO DATA", having at least one inventor in common, the same filing date of Feb. 24, 2003, as the present application.

A copending application exists having Ser. No. 10/375,582, entitled "METHOD AND SYSTEM FOR TRANSCODING VIDEO DATA", having at least one inventor in common, the same filing date of Feb. 24, 2003, as the present application.

BACKGROUND

The use of digital video has proliferated, and is expected to continue proliferating as digital data processing and data transmission speeds increase. Modifying digital video from a digital video stream having one characteristic to a digital video stream having a different characteristic is referred to generally as video transcoding. Examples of different characteristics include protocol (e.g. MPEG1 and MPEG2) and data rates, such as affected by different quantization values. When all the video information of one video stream is maintained when transcoded a different video stream lossless transcoding is said to occur. For Lossless transcoding to occur it is necessary that that the bandwidth available to the second video stream is sufficient to support the data present in the original video stream.

Currently, lossless video transcoding between protocols is accomplished by decoding a first video stream having a first protocol to generate rendered data (image data), followed by encoding the rendered data to generate a second video data stream having a second protocol. Encoding using rendered data is a computationally intensive process. Therefore, a system and/or method of transcoding would that reduces processing requirements needed for transcoding, and/or perform lossless transcoding would be useful.

FIELD OF THE INVENTION

The present disclosure relates generally to the processing of video data.

BRIEF DESCRIPTION OF THE DRAWINGS

It will be appreciated that for simplicity and clarity of illustration, elements illustrated in the FIGs. have not necessarily been drawn to scale. For example, the dimensions of some of the elements are exaggerated relative to other elements for clarity. Other advantages, features and characteristics of the present disclosure, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DESCRIPTION OF THE PREFERRED EMBODIMENT(S)

Specific methods of transcoding video data are disclosed as well as a system of transcoding data. One method of transcoding video data generates a motion vector for a dual prime macro block having a motion vector and differential motion vector for its two fields respectively. Another method of transcoding includes replacing a skipped P-macroblock that has been used to backward predict a B-Frame with a P-macroblock having a motion vector of zero. Another method of transcoding video data includes replacing a skipped B-macroblock with a macroblock having a motion vector from a macroblock of the same frame of the skipped B-Macroblock that is not co-located. A system including an open loop transcoder and a closed loop transcoder is further disclosed. A method and system of implementing lossless quantization between video protocols in a scalar manner is also disclosed. FIGS. 2-13 better describe the various aspects of the present disclosure.

Figure 1:
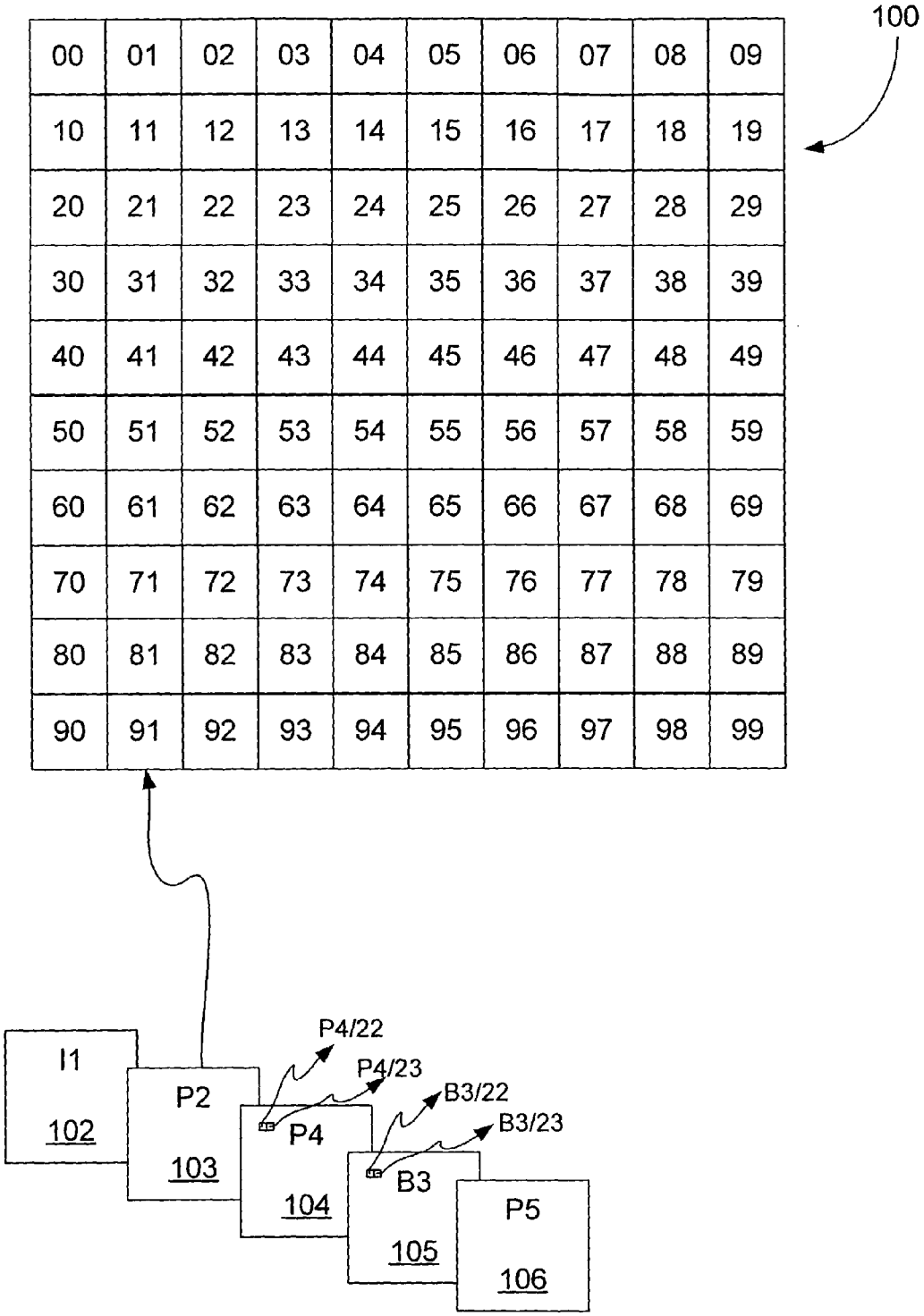
FIG. 1 illustrates a representation of video data in accordance with the prior art.

FIG. 1 is used to identify, for purposes of clarity, the nomenclature used herein. Specifically, FIG. 1 illustrates five frames 102-106 of data that represent a group of video frames. Many encoding protocols, such as protocols known as MPEG2 and MPEG4, where MPEG is an acronym for Motion Picture Experts Group, compress video data by taking advantage of redundant image portions of adjacent frames. The sequential order of the reference numbers (102-106) indicates the order that the group of frames 102-106 need to be available for decoding. For example, frame 102 needs to be available at a decoder before frame 103 can be decoded, and frame 103 needs to be available before frame 104 can be decoded, and so on.

Frame 102 is an intra frame (I frame), frames 103, 104 and 106 are forwarded predicted frames (P frames), and frame 105 is a bi-directional predicted frames (B frame). Each of the frames are further represented by a frame identifier that includes a frame type (I, P, or B) and an integer suffix to indicate the display order of the specific frame relative to the other frames. Therefore, frame B3 105 is displayed prior to frame P4 104, even though P4 104 is needed by a decoder before B3 105.

Each frame 102-106 of video data comprises a plurality of macroblocks. Each macroblock in a frame has a corresponding image location where its data, if any, representing an image is to be displayed. For illustrative purposes, FIG. 1. represents a frame template 100 identifying image locations 00 through 99. Therefore, image location 22 has a screen location that is immediately adjacent horizontally to image locations 21 and 23. When discussing specific macroblocks of a frame, the frame identifier (I1, P2, P4, B3, P5) is further modified by appending the image location number after a slash "/". Therefore, the macroblock associated with image location 22 for frame P4 104 would be referred to herein as macroblock P4/22 104, and the macroblock associated with image location 23, adjacent to macroblock 22, in frame P4

104 would be referred to as P4/23 104. Additional prefix and suffix information with respect to specific frames or macroblocks will be discussed as needed herein.

Figure 2:
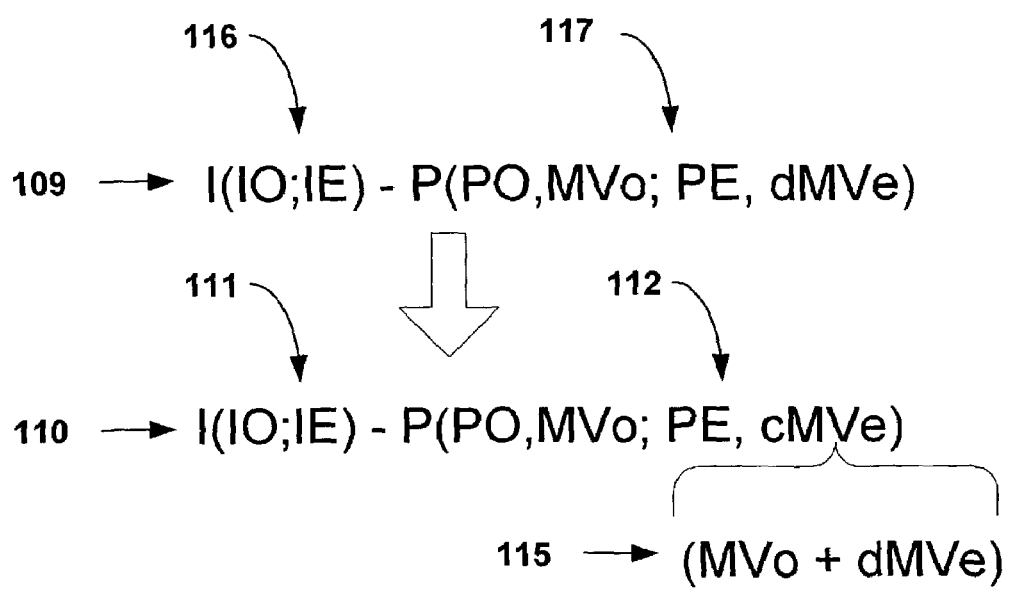
FIGS. 2-6 illustrates a video stream being transcoded in accordance with the present disclosure.

FIG. 2 illustrates graphically, a representation of a first macroblock based data stream 109, such as a MPEG2 data stream, being converted to macroblock based data stream 110 having a different protocol, such as a MPEG4 data stream. Specifically, the MPEG2 stream portion 109 includes an I frame 116 followed by a P Frame 117. Note that macroblock location is not a consideration with respect to FIG. 2. The syntax contained within the parenthesis of frames 116 and 117 of the data stream 109 indicates that each macroblock of the frames 116 and 117 include an upper field data and a lower field data, which are also referred to as odd and even fields, respectively. Specifically, the syntax IO and IE refer to an odd image field texture and an even image field texture, respectively, for an I frame; PO and PE refer to an odd field texture, or prediction, data and an even field texture or prediction data, respectively, for a P frame; while MVo and MVe refer to an odd field motion vector and an even field motion vector, for a P frame.

A specific mode of MPEG2 encoding is known as dual-prime mode. With dual prime mode encoding, either the odd or even field motion vectors associated with a P macroblock of data is a differential motion vector, designated dMV as opposed to a non-differential motion vector, or a direct motion vector. A differential motion vector can be combined with the non-differential motion vector of the other field of the same frame to generate a calculated motion vector, designated cMV in FIG. 2. Referring to FIG. 2, the P frame 117 includes a motion vector (MVo) for the odd field, and a differential motion vector (dMVe) for the even field.

Dual-prime mode is not supported by the MPEG4 protocol. Therefore, in accordance with a specific embodiment of the present disclosure, the MPEG2 data stream 109 is modified to be MPEG4 compliant. In accordance with one embodiment of the disclosure, the MPEG2 stream 109, which has been encoded using dual-prime mode to have a differential motion vector (dMVe), is shown being converted to a MPEG4 compliant stream 110 that includes P-frame 112, which has two prediction fields (PO, PE), and two respective motion vectors (MVo, cMVe).

As illustrated in FIG. 2, MPEG4 stream 110 differs from MPEG2 stream 109 in that the differential motion vector, dMVe associated with the even field, of the MPEG2 P-frame 117 has been replaced with a calculated motion vector cMVe. The calculated motion vector cMVe, as represented by equation 115, is determined based upon a combination of the motion vector for the other field in the macroblock, the odd field motion vector in this example, and a value represented by the differential motion vector (dMVe). By replacing the differential motion vectors with motion vector calculated in this manner, a compliant MPEG4 macroblock can be generated in a lossless manner.

Another MPEG2 mode of operation that is not supported by MPEG4 deals with skipping of co-located P macroblocks. While both the MPEG2 and MPEG4 protocols allow for the skipping of macroblocks, i.e. no texture or motion vector data provided for a macroblock, skipping of a P frame macroblock in MPEG2 that is used along with a co-located B-macroblock to predict an image is permitted. However, when a P macroblock is skipped in MPEG4, the B macroblock is skipped as well. This can be better understood with reference to FIGS. 3 and 4.

Figure 3:
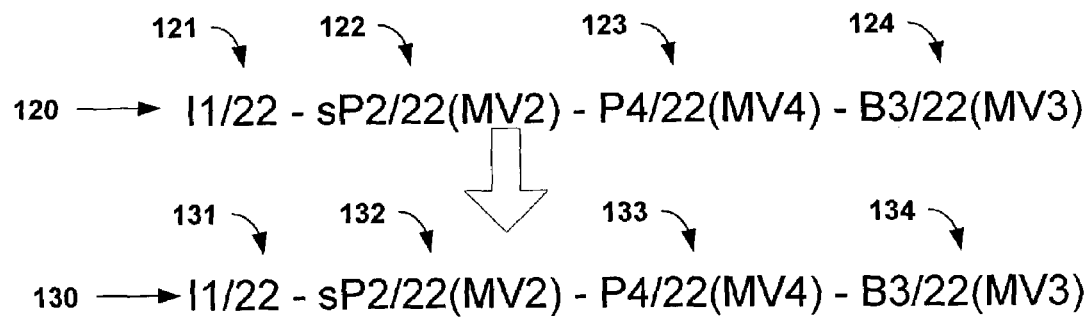

Referring to FIG. 3, specific macroblocks 121-124 are illustrated to represent a portion of an MPEG2 stream 120. The data stream 120 represents a specific image location of frame data that is generally received sequentially. For purposes of illustration, the macroblocks 121-123 are received in an order indicated by their reference numbers 121-124. Therefore, with respect to FIG. 3, the macroblock are received in the following order: I1-P2-P4-B3.

The portion of the MPEG 2 stream 120 illustrated in FIG. 3 includes an I macroblock 121, associated with a frame identifier I1; two P frame macroblocks 122 and 123, associated with frame identifiers P2 and P4, respectively; and a B frame macroblock 124, associated with a frame B3. The integer suffix of each frame identifier for macroblocks type 121-124 indicates the display order of each frame. For example, the macroblock I1 is to be displayed prior to the macroblock P2, which is to be displayed before the macroblock B3, which is to be displayed before the macroblock P4. It will be appreciated that the reception order of the frame data, that includes the macroblocks of stream 120, is not necessarily the same as the display order when B frames are used. A slash (/) and numeric indicator following the frame reference indicates the display location of the macroblock.

The P and B macroblocks of FIG. 3 have motion vectors as indicated by the references MV in the parenthesis following the numeric indicator specifying the display location. For example, MV2 is the motion vector associated with the P2 frame. A macroblock having an "s" prefix, such as for macroblock P2/22, is a skipped macroblock, which in reality has no texture or motion vector data. Because skipped macroblock sP2/22 122 is a previously decoded macroblock, and macroblock B3/22 124, is predicted relative to P4/22 123, stream 120 contains a MPEG2 protocol that is also valid in a MPEG4 stream protocol once any necessary quantization scaling is performed.

Figure 4:
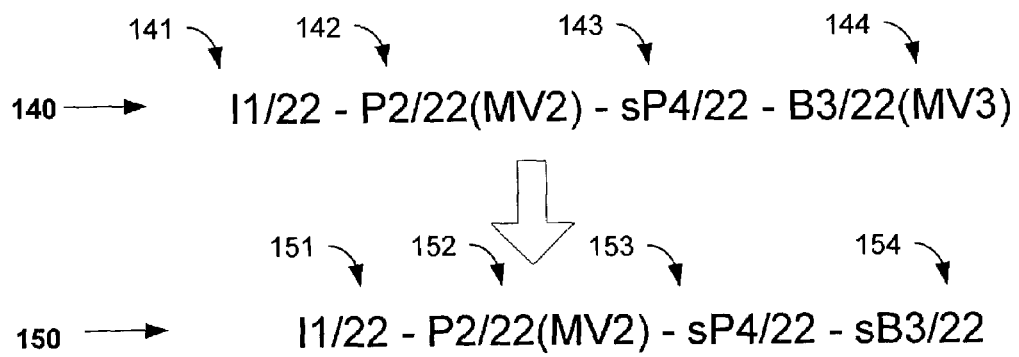

Referring to FIG. 4, the skipped P macroblock P4/22 143, of stream 140, is coded with B macroblock B3/22 144 that has texture and or motion vector data. During MPEG2 decoding, the skipped macroblock data for sP4/22 143 is predicted from the rendered data associated with the co-located macroblock P2/22 142, and the macroblock B3/22 144 is rendered using the predicted data for P4/22 143 and the prediction error data and motion vector data of macroblock B3/22 144. However, MPEG4 requires a B macroblock to be skipped when the previously decoded collocated P macro-block that is to be displayed subsequent to the B macroblock is skipped and prohibits to encoding of any data for the said macroblock B3/22 144. FIG. 4 illustrates a non-lossless option for converting the MPEG2 stream to an MPEG4 stream by skipping the B macroblock B3/22 144 in the converted MPEG4 stream 150. However, since the data associated with the macroblock B3/22 of stream 140 would not used, skipping the B3/22 macroblock in stream 150 results in a lossy solution relative to the MPEG2 stream.

Figure 5:
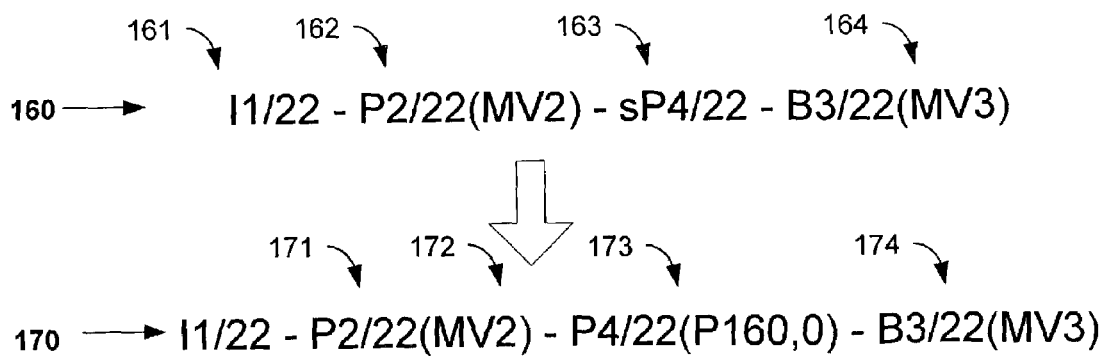

FIG. 5, provides a lossless MPEG2 to MPEG4 transcoding solution for an MPEG2 stream having a skipped P frame, displayed after a B-frame that is predicted based on the P-frame that is used by a co-located B frame. Specifically, the skipped MPEG2 macroblock sP4/22 163 is encoded in the MPEG4 stream 170 with relevant texture and motion vector. In one embodiment, the relevant texture is the predicted texture for skipped macroblock P4/22 163 in stream 160. Note that MPEG2 macroblock p4/22 (P160,0) 173 where the p160 designator indicates that macroblock P4/22 includes the decoded texture data, for the skipped frame SP4 163 from stream 160, which is the same as the texture data from the previously decoded co-located macroblock, P2/22 172. The value "0" in the parenthesis of macroblock P4/22 173 indicates the motion vector is set to zero. In this manner, the data associated with the B macroblock 164 in MPEG2 stream 160

B3/22 (MV3) 164 can be duplicated, and used, in the MPEG4 stream 170, so that lossless transcoding is realized.

Figure 6:
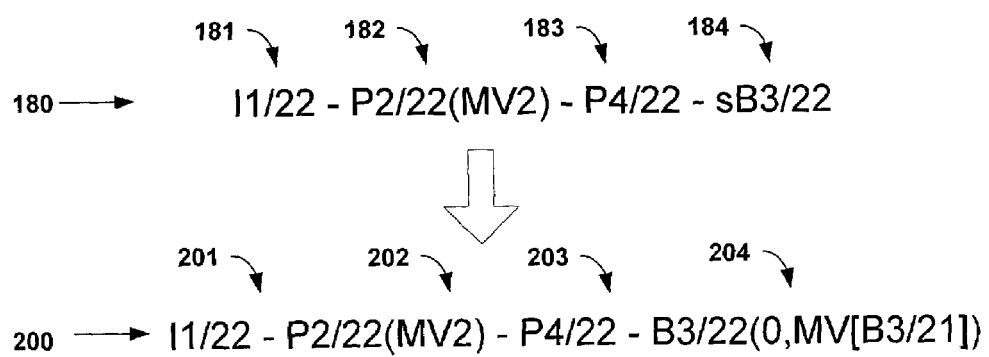

FIG. 6 illustrates a MPEG2 stream 180 being converted to a MPEG4 stream 200. Specifically, the stream 180 illustrates a skipped B macroblock, sB3/22 184, that is portion of a B frame B3. Since MPEG4 does not treat the skipped B macroblock in the same way that MPEG2 does, an accommodation needs to be made to allow for a lossless conversion. As illustrated in FIG. 6, sB3/22 184 is replaced in the MPEG4 steam with B3/22 (0, MV[B3/21]), where the prediction error data is set at zero, and the motion vector is set equal to the motion vector of a macroblock of the B-frame B3 that is not co-located with the macroblocks being decoded. For example, the motion vector of the previous macroblock B3/21 (not illustrated) of the same frame is used. Note that if the macroblock is being transcoded the first location of the B frame sequence, i.e. B3/00, a motion vector of zero (0) can be used. This results in a lossless transcoding since no new data was provided by the skipped B macroblock, and B macroblocks are not used for further prediction.

Figure 7:
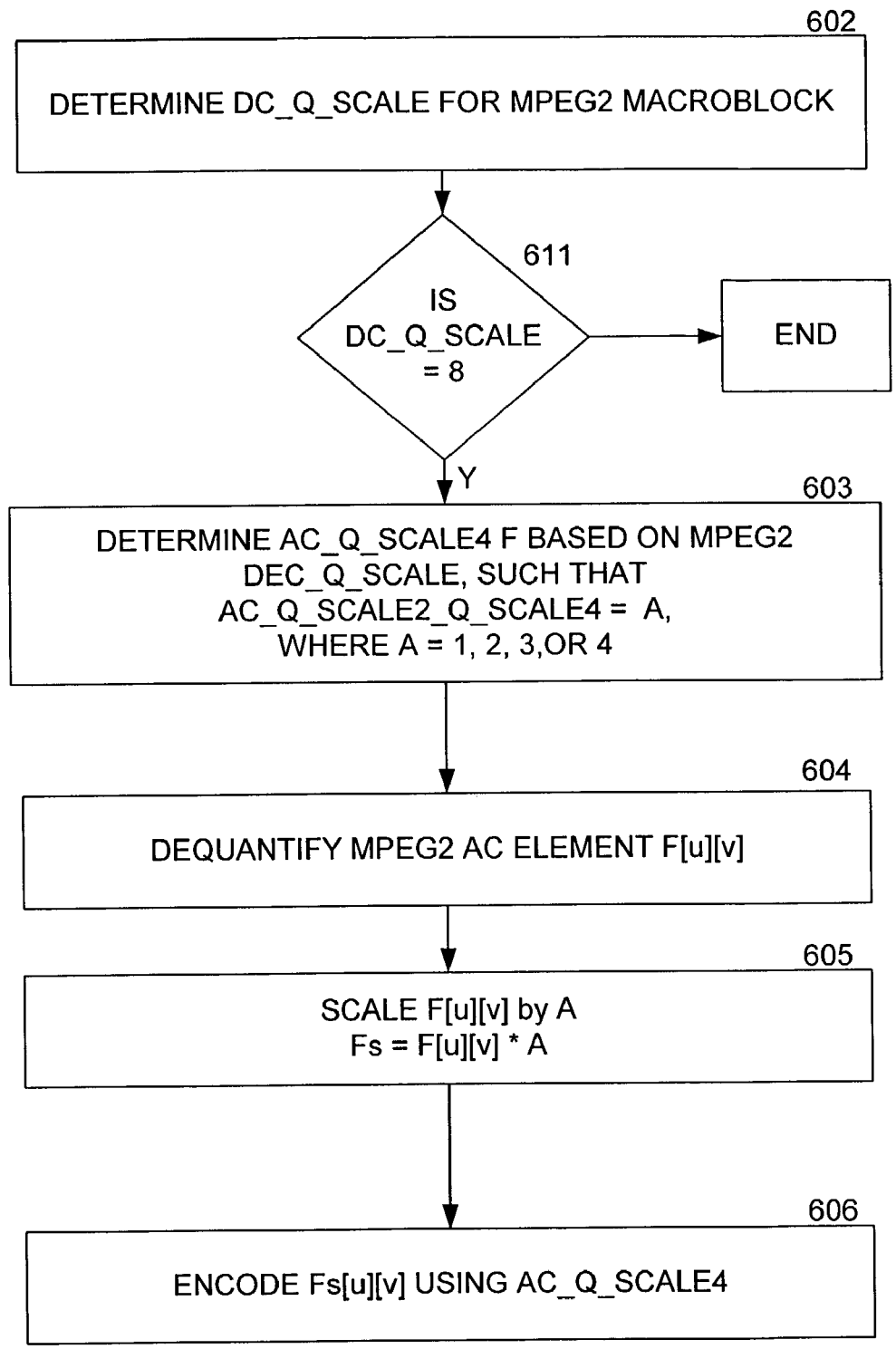
FIG. 7 illustrates a method of quantization in accordance with the present disclosure.

FIG. 7 illustrates a method that can be used to transcode data streams supporting different quantization methods. The embodiment illustrated in FIG. 7 re-quantizes data from a mode compliant with MPEG2 to a mode compliant with MPEG4. Specifically, the method of FIG. 7 can be implemented in a scalar manner without decoding and encoding the data stream.

MPEG4 allows the use of two quantization methods. One method is known as the MPEG2 mode by the MPEG4 world, while the other is know as MPEG4, or MPEG4 mode. Although the default quantization matrices in use in the MPEG4 mode are different from the quantization method in use in the MPEG2 mode it is possible in MPEG4, as in MPEG2, to transmit specific matrices. The major difference between the MPEG2 mode and the MPEG4 mode comes from the way the DC sample in the intra block is processed.

Specifically, the quantization step used in MPEG2 for processing the DC sample in the intra block lies in the range {8, 16, 32}, and is not dependent on the quantization step used to quantify the AC sample. This is not the case with MPEG4 mode, wherein the DC quantization step varies with the AC quantization step in a piecewise linear manner for AC quantized values greater than 4. This difference in the use of the DC sample with respect to the quantizing AC sample can prevent lossless transcoding of the intraframe that propagates an error to all subsequent frames based on the intraframe (group of pictures).

One method of lossless transcoding from MPEG2 to MPEG4 is illustrated by the flow diagram of FIG. 7, and can be utilized when the MPEG2 quantization scale is equal to eight (8).

At step 602, the value of the MPEG2 data DC quantization scalar (DC_Q_SCALE2) is determined. At step 1011, a determination is made whether DC_Q_SCALE2 is equal to 8. If so, an MPEG4 AC quantization scalar (AC_Q_SCALE4) can be used having a value of 1, 2, 3, or 4, as allowed by the MPEG4 DC Lookup table. If not, the scalor method of FIG. 7 cannot be used to requantize the MPEG2 data stream.

At step 603, AC_Q_SCALE4 is determined by selecting a value of AC_Q_SCALE4 such that (AC_Q_SCALE2)/(AC_Q_SCALE4)=A, where AC_Q_SCALE2 is the AC quantization scalar of the MPEG2 data, and A is equal to a value of 1, 2, 3, and 4. By selecting AC_Q_SCALE4 to maximize the value of A, greater compression will be realized on the transcoded stream.

At step 604, the MPEG2 AC element F"[u][v] is dequantified to obtain F[u][v].

At step 605, dequantified valued F[u][v] is scaled by A (F[u][v]*A) to obtain Fs[u][v].

At step 606, scaled value Fs[u][v] is encoded using the AC_Q_SCALE4 value determined in step 603, and the value AC_Q_SCALE4 is encoded as well in the MPEG4 data stream.

Figure 10:
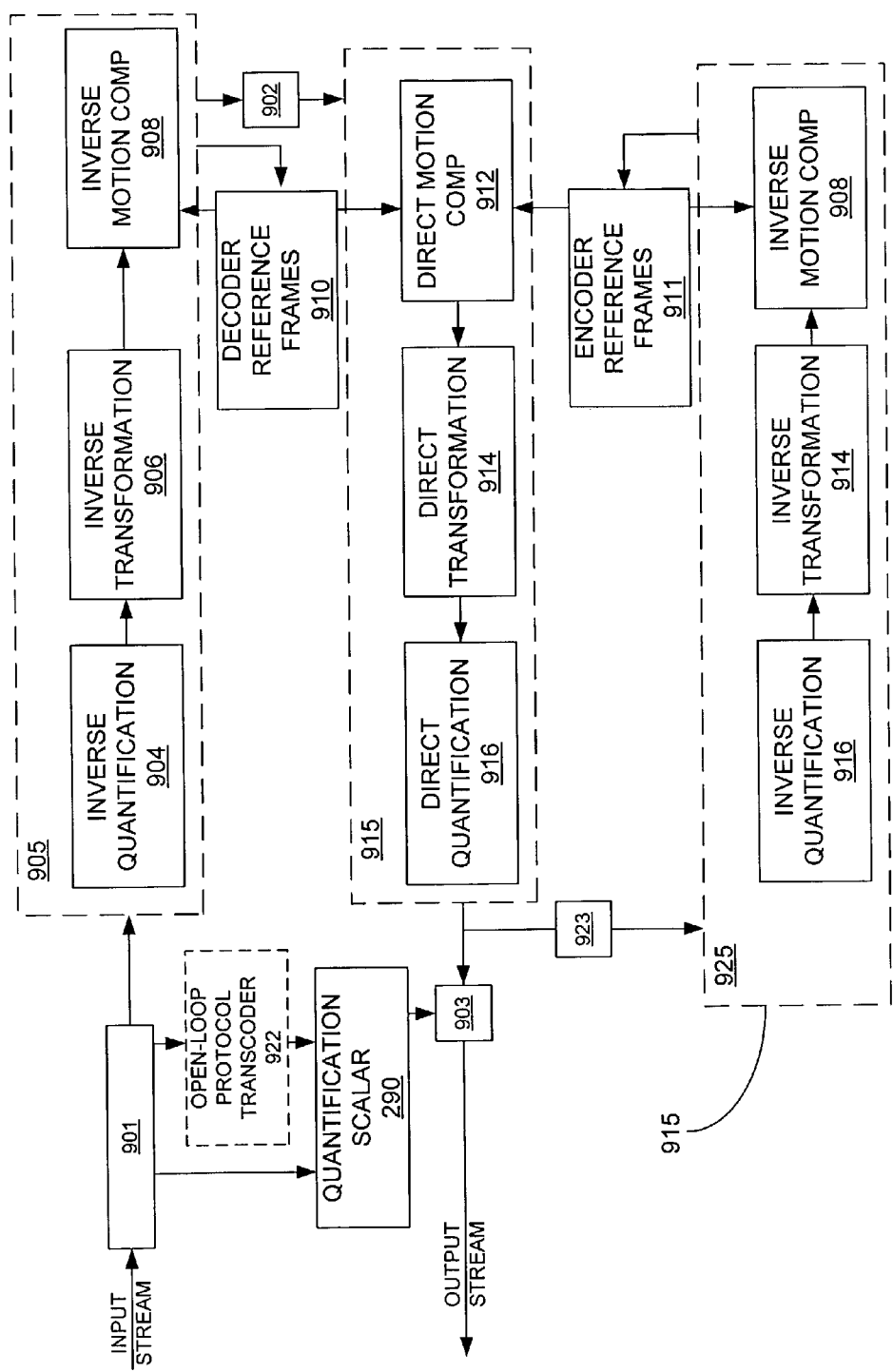
FIG. 10 illustrates, in block diagram form, a system in accordance with the present disclosure.

The method illustrated in FIG. 10 allows for the lossless transcoding of quantified macroblock data from MPEG2 to MPEG4 mode, where MPEG4 encoding is utilized. In this case the quantization scale in use by the MPEG4 intra block encoding can be kept lower than 5, allowing the quantization value for each macro block transcoded to MPEG4 to be adjusted to maintain a lossless transcoding.

Figure 8:
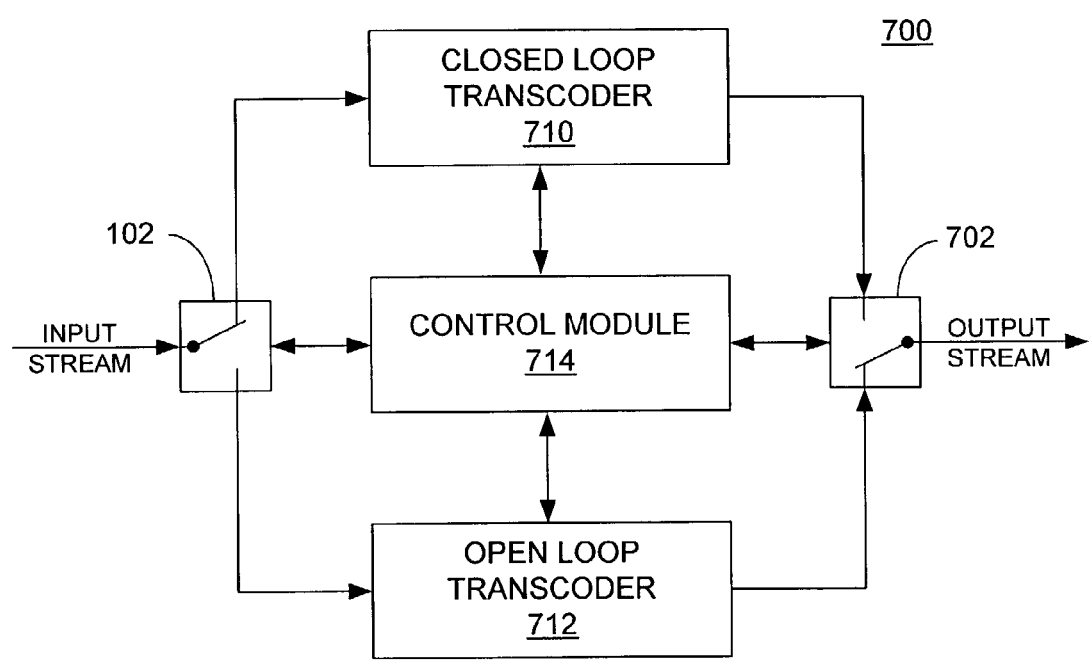
FIG. 8 illustrates, in block diagram form, a system in accordance with the present disclosure.

FIG. 8 illustrates a system in accordance with a specific embodiment of the disclosure. FIG. 8 illustrates a system 700 that comprises a closed loop transcoder 710, an open loop transcoder 712, a control module 714, an input select switch 102, and an output select switch 702.

In operation, an input stream comprising digital video data is received by the system 100. The digital video data will generally include frame based video data such as video data specified by various MPEG specifications, however, it will be appreciated that other proprietary and standard video data protocols can be received as well.

The control module 714 monitors information from the input stream to control switches 102 and 702 to control operation of closed loop transcoder 710 and open loop transcoder 712. In addition, control module 714 controls switch 702 to provide an output stream transcoded relative to the input stream. Generally, the control module 714 will enable one of the closed loop transcoder 710 and the open loop transcoder 712 to provide the output data stream. More specifically, the control module 714 operates to select as the source of the output data, one of the closed loop transcoder 710 or the open loop transcoder 712 an to control the transcoding process. In one embodiment, the switch function that results in the selection of the output is implemented by controlling an actual switch, such as switch 702. In an alternate embodiment, the switch function is implemented by enabling one of the outputs of the closed loop transcoder 710 and the open loop transcoder 712 so that only one of the transcoders provides the output stream.

A closed loop transcoder is a transcoder system that following the generation of a transcoded data frame, the transcoded data frame is decoded to provide the encoder portion of the transcoder a decoded reference frame based upon the transcoded data frame. In an open loop transcoder, the transcoded data frame is not decoded to provide a reference frame to the transcoder.

In one embodiment, the control module 714 selects closed loop transcoder 710 to transcode a macroblock of frame data when the transcoding of the received macroblock is to result in a scaling of the data rate (i.e. data reduction) that is close to one (i.e. no data reduction), and any reference frames, relative to the received frame, have also been encoded in open-loop mode. In one embodiment, the open loop transcoder is used when lossless transcoding can be used to perform a lossless transcode of the input data. For example, using one of the lossless techniques of FIG. 2, 3, 5, 6, or 7 described herein. In other embodiments, lossy techniques, such as the technique of FIG. 4 can be implemented using the system 700.

Figure 9:
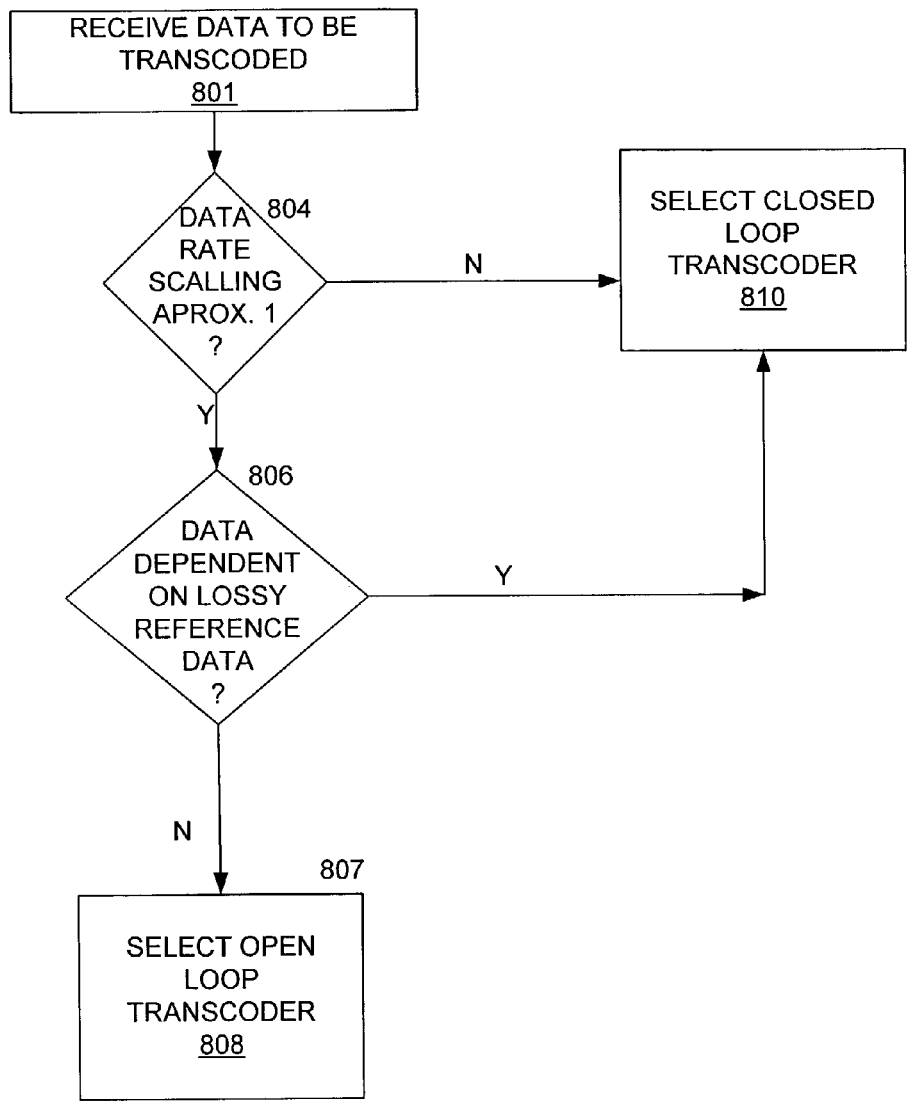
FIG. 9 illustrates a method a method in accordance with the present disclosure.

FIG. 9 illustrates a method of selecting between the open-loop transcoder 72 and the closed-loop transcoder 710.

At step 801, data to be transcoded is received. In one embodiment this received data is associated with a frame of video data. At step 804, a determination is made whether the data is to undergo a data reduction scaling of approximately one based upon a precision value of the system. For example, a system can be preset, in a programmable or fixed manner, to execute step 806 when it is determined that the data is to be scaled within a specific range, such as 0.8 to 1.2. Otherwise the flow proceeds to step 810, where the closed loop transcoder 710 is selected.

It will be appreciated that when the transcoding to be performed includes a data rate scaling that is not close to one (i.e. a significant change, e.g. reduction, in data rate) that a new quantization will need to be performed during the encoding operation. This re-quantization step is a lossy operation that is performed by a lossy transcoder, such as the closed loop transcoder 712. When a lossy transcode occurs to a reference frame, the loss of information will be propagated to any frames that will be subsequently predicted using the reference frame. The need to avoid this error propagation due to lossy transcoding results in the use of the closed loop transcoder.

At step 806, a determination is made whether the data to be transcoded is dependent on reference frames themselves were transcoded by a lossy process (i.e. transcoded using the closed loop transcoder 710). One way of determining if the reference frames are themselves lossy is for the transcoder 710 and/or 712 to attach a flag to a frame of transcoded data to indicate whether a lossy or lossless transcode was used, and for the control module 714 to monitor this flag. Generally this flag will be an internal flag, providing the transcoder "state" (open/close) used at step 806. This allows the transcoder to know how previously transcoded frames where transcoded. If the reference frame has been encoded in lossy mode or if the current frame is targeted to be encoded in a lossy mode, e.g. the scaling is considered important, then the close loop transcoder is selected (lossy mode) otherwise flow proceeds to step 808 and the open loop transcoder (losseless) is selected.

FIG. 10 illustrates a specific implementation of the transcoder of FIG. 8 in greater detail. The transcoder of FIG. 10 comprises a closed-loop transcoder and a plurality of open-loop transcoders as represented by a plurality of open-loop transcoder paths. It will be appreciated that specific embodiments may include one or more of open-loop transcoder paths illustrated in FIG. 10. Selection among the open-loop transcoders is controlled by elements 901-903, 921, and 931, which at least partially represent the control module 714 of FIG. 8.

The closed loop transcoder of FIG. 10 is represented by the elements that form the data path including control elements 901, 902 and 923, decoder 905, decoder reference frames 910, encoder 915, closed-loop decoder 923, and encoder reference frames 908. When a macroblock or frame is sent to the closed-loop transcoder it is decoded to produce a decoded reference frame which is stored with the decoder reference frames 910. Typically the data will be decoded in a conventional manner using an inverse quantification module, an inverse transformation module, and an inverse motion compensation module. It will be appreciated that additional modules, or different, modules may be used to generate the decoder reference frames. Once a frame is decoded it can be sent to the encoder 915, through the decoder reference frames 910 memory, or through an alternate path 902, for encoding.

Typically the data will be encoded in a conventional manner using a motion compensation module, a transformation modules (such as a discrete cosine transformation module), and a quantification module. It will be appreciated that additional modules, or different, modules may be used to generate the decoder reference frames. Once a frame is encoded it is provided to the output stream through control element 903, and to the closed-loop decoder 925 through control element 923. Typically the newly encoded data will be decoded in a conventional manner by closed loop decoder 925 using an inverse quantification module, an inverse transformation module, and an inverse motion compensation module. It will be appreciated that additional modules, or different, modules may be used to generate the decoder reference frames. Once the newly encoded frame is decoded it is stored in the encoder reference frames memory for use by the encoder 915.

FIG. 10 represents a plurality of open-loop transcoders. One or more of the open-loop transcoders can be implemented in accordance with the present disclosure. In one embodiment a single open-loop transcoder is implement by the data path including control elements 901, 903, decoder 905, and encoder 915. In this embodiment, a macroblock or frame from the input stream is transcoded by being provided to the decoder 905 generate a reference frame. Subsequently, the decoded reference frame is encoded to provide data to the output stream. In one embodiment, the open-loop transcoder is selected when the data being transcoded is being transcoded in a lossless manner, thereby reducing the need to decode the data subsequent to encoding, since the original reference frame being encoded contains substantially the same data.

Another embodiment of an open-loop transcoder is illustrated by the data path that includes the control elements 901 and 903, and quantification scalar 290. In one embodiment, quantization scalar 290 is used when a macroblock or frame of the input stream needs quantification scaling for purposes of protocol conversion, such as discussed with reference to FIG. 7 for scaling input data from MPEG2 format to MPEG4 format. Once transcoded (e.g. scaled to be compliant with a different protocol), the data is provided to the output stream. In order to assure that the received data is available for any subsequent decoding steps, the data can also be provided to the reference frame decoder portion 905 so that a reference frame can be stored in the decoder reference frames location 910. It will be further appreciated that the scaling function performed by the quantization scalar 290 can also be performed by the first transcoder described. However, the first transcoder is more complex requiring more processing resources than use of the quantization scalar 290. Therefore, use of the quantization requires fewer processing resources resulting in a more efficient transcoder implementation.

Another open-loop transcoder is represented by the data path that includes the control element 901, the open-loop protocol transcoder 922, and the quantizer scalar 290, and the control element 923. Input stream data sent to the open-loop protocol transcoder 922 can be transcoded heuristically using the methods described with reference to FIGS. 2-6, and provided to the quantization scalar as needed. In this manner the amount of processing resources needed to transcode input data is reduced. The open-loop protocol transcoder is illustrated as being implemented separate from the decoder 905 and the encoder 915. However, it will be appreciated that in another embodiment the open-loop protocol transcoder function could be implemented as part of one or both of the decoder 905 or the encoder 915. For example the macroblocks from the input stream could be inverse quantified by the decoder 905 and provided to the encoder 915, by control module 902, before inverse transformation, thereby allowing the data to be heuristically transformed. A heuristical transformation module, such as open-loop protocol transcoder 922, within the encoder 915 could be used to transcode the data prior to quantization. Once heuristically transformed, the data would be quantized, generally by quantization module 916, and provided to the output stream. In another embodiment, the input data would not need to be inverse quantized, and instead, the heuristically transformed data would be sent to the quantization module 290 (connection not shown) before being provided to the output stream. A specific embodiment of operation of the system of FIG. 10 can be further appreciated based on the method of FIGS. 11-13.

Figure 11:
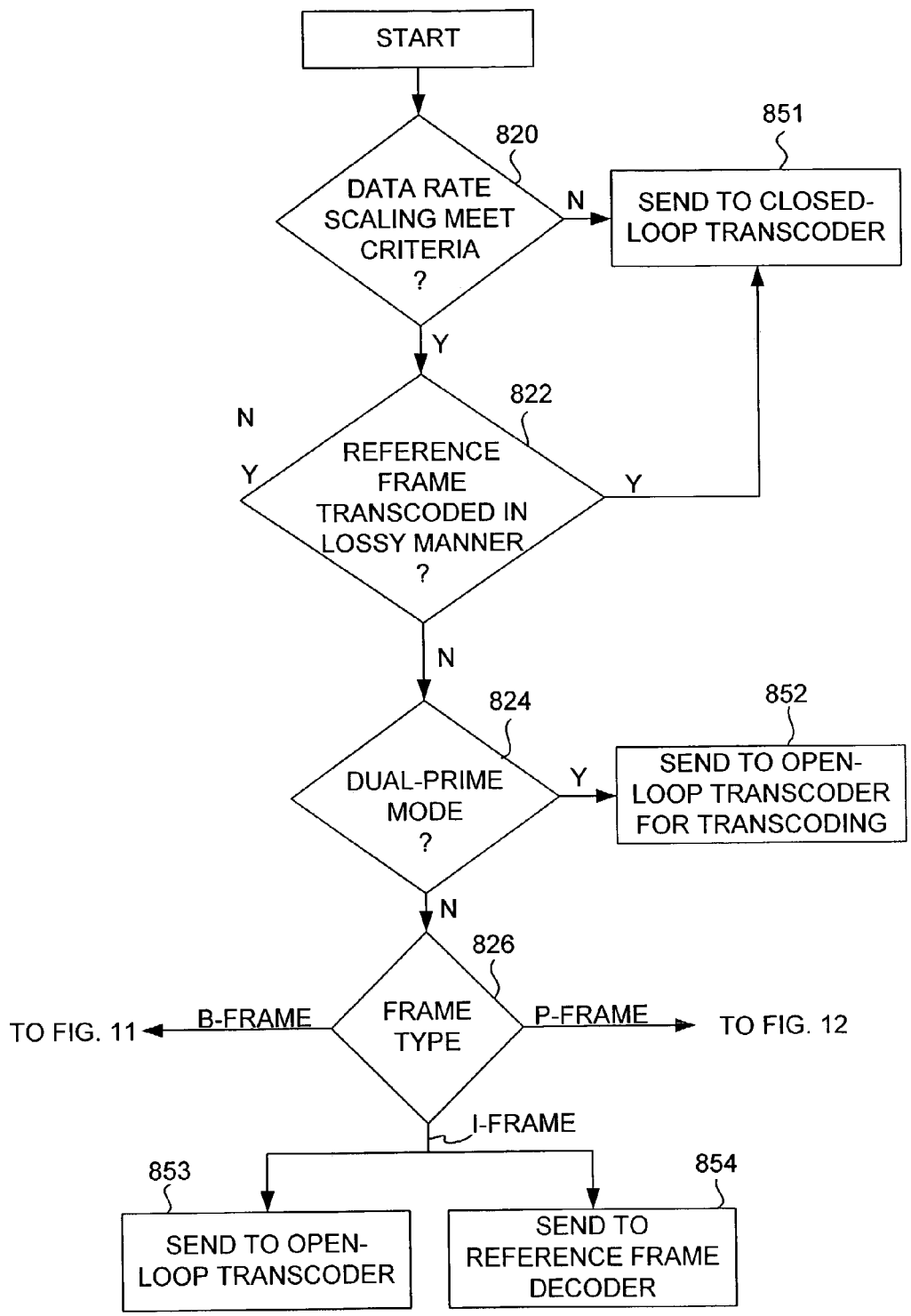
FIGS. 11-13 illustrate, in flow diagram form, a method in accordance with the present disclosure.

At step 820 of FIG. 11, a determination is made whether a data rate scaling criteria is met. In one embodiment, when a data rate scale factor substantially close to 1, as predefined by the system or a user, is to be maintained, the criteria is met and the flow proceeds to step 822. Otherwise, if significant data rate scaling is to be performed, for example resulting in a loss of data when a lower data rate needs to be supported, the flow proceeds to step 851, whereby the data being evaluated is sent to the closed-loop encoder for transcoding so that an encoder reference frame will be generated by the closed-loop decoder 915.

At step 822 a determination is made whether the macroblock or frame data being evaluated is dependent upon a reference frame that was transcoded in a lossy manner. If so, the flow proceeds to step 851, so that the current data can be transcoded by the closed-loop transcoder using the lossy reference data. Otherwise, the flow proceeds to step 824.

At step 824 a determination is made whether the current macroblock was encoded using dual prime mode as discussed with reference to FIG. 2. If so, the flow proceeds to step 852 where the macroblock is sent to an open-loop transcoder for transcoding, otherwise the flow proceeds to step 826. It will be appreciated that with respect to the specific system of FIG. 10 that the open-loop transcoder of step 852 can be the open-loop protocol transcoder for heuristic transcoding, or to the open loop transcoder that includes the decoder 905 and the encoder 915. Where a heuristic transformation is performed, the data will typically be sent to the step 853, where the macroblock is decoded to generate a reference frame for use in the decoding of subsequent reference frames, if needed.

At step 826 a determination to identify an associated frame-type of the data being transcoded. If B-type data is being transcoded, the flow proceeds to FIG. 12; if a P-type data is being transcoded the flow proceeds to FIG. 13; if an I-type data is being transcoded the flow proceeds to steps 853 and 854.

At step 853 the I-type frame is sent to an open-loop transcoder for transcoding. In one embodiment a quantization scalar, such as quantization scalar 290, is the open-loop transcoder used to transcode the data. It will be appreciated that other open-transcoders can also be used. In addition, I-frame data is sent to a reference frame decoder at step 854, such as decoder 905, to facilitate the decoding of subsequent frames that reference the current I-frame.

Figure 12:
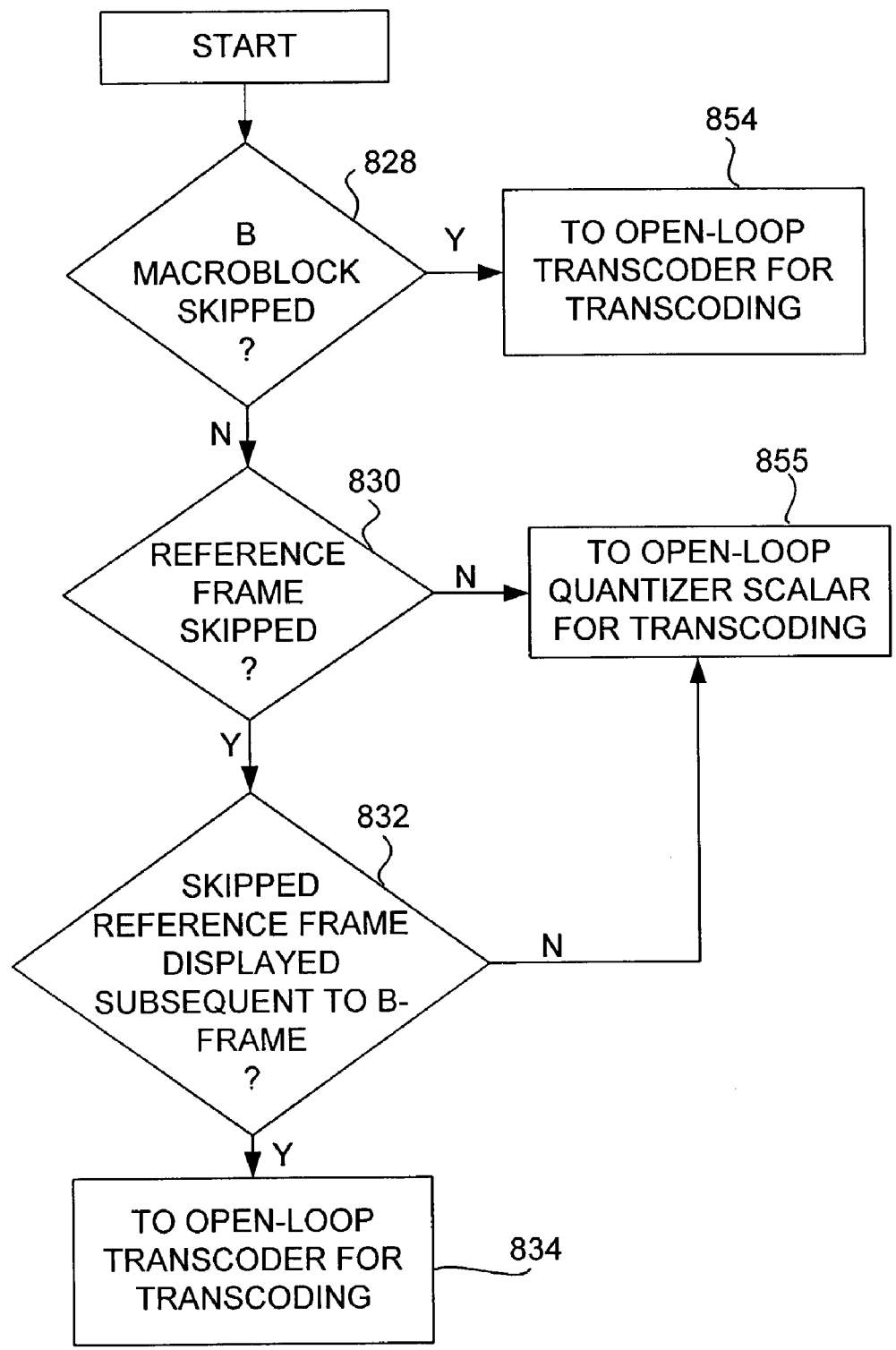

When B-type data is encountered at step 826, flow proceeds to step 828 of FIG. 12. At step 828 a determination is made whether the B macroblock being evaluated has been skipped. If so, flow proceeds to step 854, where the skipped macroblock, or an indication of the skipped macroblock is provided to an open-loop transcoder for transcoding. It will be appreciated that the open-loop transcoder need not perform any actual data transformation where a transcoding between protocols is being performed and the syntax for identifying a skipped B macroblock is the same for both protocols.

If the B macroblock was not skipped, the flow proceeds to step 830 where a determination is made whether the B macroblock depends reference data that itself was received as skipped data. When the B macroblock does not depend on skipped reference data the flow proceeds to step 855 where the macroblock information is sent to an open-loop transcoder, such as the open-loop quantizer scalar 290. Otherwise the flow proceeds to step 832.

At step 832 a determination is made if the skipped reference data upon which the B macroblock depends is a subsequently displayed reference data, e.g. displayed, relative to the skipped B-frame being evaluated. Where the transcode being performed is from MPEG2 to MPEG4, this is invalid in MPEG4, and the skipped reference frame, or an indication of the skipped reference frame, is sent to the open-loop transcoder for transcoding. In one embodiment, the open-loop protocol transcoder 922 can be used to transcode the skipped B-frame in accordance with the method of FIG. 4 or FIG. 5. In another embodiment, the open-loop transcoder including the decoder 905 and the encoder 915 can be used.

If the B macroblock is not dependent on subsequently displayed reference data the flow proceeds to step 855, where an indication of the skipped B macroblock is provided to an open-loop transcoder, such as open loop transcoder 922 of FIG. 10.

Note that none of the B-macroblocks are indicated as decoded when the open-loop transcoding is used. This is because B-frames are not used as reference frames, making their decode unnecessary to support the decode of subsequent frames.

Figure 13:
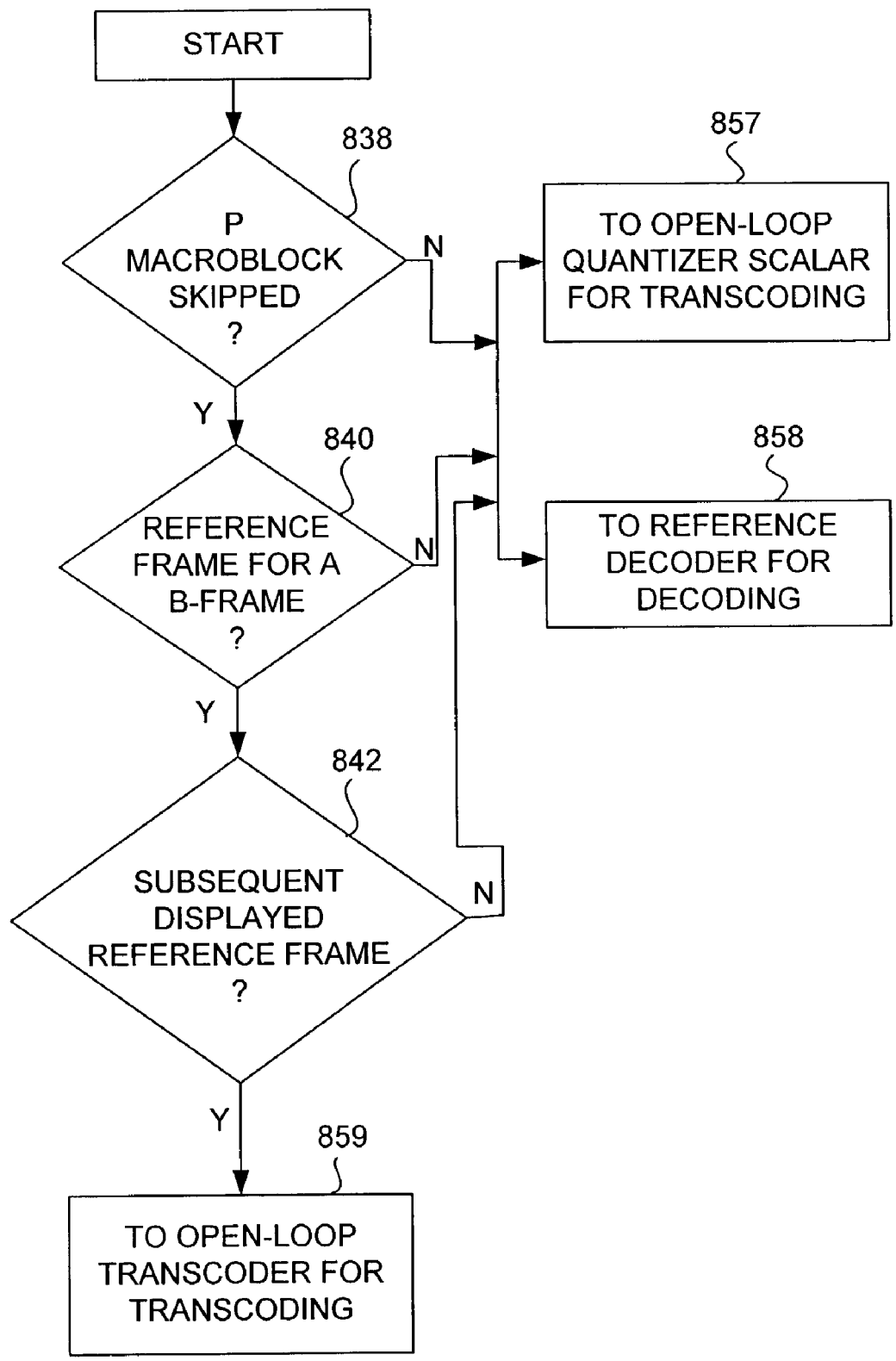

FIG. 13 illustrates a flow used when it is determined at step 826 of FIG. 11 that data associated with a P-frame is being transcoded. At step 838 a determination is made whether the P macroblock being evaluated has been skipped. If not, flow proceeds to steps 857 and 858. At step 857, an indication of the skipped macroblock is provided to an open-loop transcoder such as the open-loop quantizer scalar, for transcoding. It will be appreciated that the open-loop transcoder need not perform any actual data transformation where a transcoding between protocols is being performed and the syntax for identifying a skipped P macroblock is the same for both protocols. At step 858, an indication of the skipped macroblock is provided to a reference decoder, such as decoder 905.

If the B macroblock was skipped, the flow proceeds to step 840 where a determination is made whether the P macroblock is a part of a reference frame for a B macrobock. If not, the flow proceeds to steps 857 and 858. Otherwise, the flow proceeds to step 842 where a determination is made whether the P data being evaluate is subsequently displayed reference data to reconstruct a B-frame. If not the flow proceeds to steps 857 and 858 for transcoding.

If the P macroblock is reference data for a B-frame and subsequently displayed relative to the B-frame, the flow proceeds to step 859 where the P data is sent to an open-loop transcoder for transcoding.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

In the preceding detailed description of the figures, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical, chemical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. For example, the present disclosure refers specifically to MPEG2 and MPEG4 protocols. It will be appreciated that the present disclosure can apply to other protocols, many of which are variations of one or more MPEG protocols. The preceding detailed description is, therefore, not to be taken in a limiting sense, and the scope of the present disclosure is defined only by the appended claims.

What is claimed is:

1. A video processing device comprising:
   an open loop transcoder having an input to receive an input video data and an output to provide a first transcoded representation of the input video data;
   a closed loop transcoder having an input coupled to the input of the open loop transcoder, and an output coupled to the output of the open loop transcoder to provide a second transcoded representation of the input video data; and
   a select module to select the first transcoded representation for output as an output video data in response to determining the input video data is lossless encoded.

2. The video processing device of claim 1, wherein the closed loop transcoder further comprises:
   a first decoder portion having an input to receive the input video data, and an output; and
   an encoder portion having an input coupled to the output of the decoder portion output, and an output to provide the second transcoded representation.

3. The video processing device of claim 2, wherein the input of the encoder portion is coupled to the output of the first decoder portion through a frame buffer.

4. The video processing device of claim 2, wherein the closed loop transcoder further comprises:
   a second decoder portion having an input coupled to the output of the encoder portion, and an output coupled to the input of the encoder portion.

5. The video processing device of claim 4, wherein the input of the encoder portion is coupled to the output of the second decoder portion through a frame buffer.

6. The video processing device of claim 4, wherein the input of the encoder portion is coupled to the output of the first decoder portion through a first frame buffer.

7. The video processing device of claim 6, wherein the input of the encoder portion is coupled to the output of the second decoder portion through a second frame buffer.

8. The video processing device of claim 7, wherein the first and second frame buffers are a common frame buffer.

9. The video processing device of claim 2 further comprising an control module coupled to the first encoder to enable the first decoder in response to video data of a first type being received at the input of the first decoder and to disable the first decoder in response to video data of a second type being received at the input of the first decoder.

10. The video processing device of claim 9, wherein the video data of the first type is frame data of a B-type.

11. The video processing device of claim 10, wherein the video data of the second type is frame data of a P-type.

12. The video processing device of claim 10, wherein the video data of the second type is frame data of an I-type.

13. The video processing device of claim 1, wherein the open loop transcoder is a lossless transcoder.

14. The video processing device of claim 1, wherein the closed loop transcoder is a lossy transcoder.

15. The video processing device of claim 1, wherein the open loop transcoder includes a scalar.

16. The video processing device of claim 1 wherein the select module further is to select the second transcoded representation for output as the output video data in response to determining the input video data is lossy encoded.

17. A method comprising:
   determining, at a video processing device, whether a video input data is to be scaled with respect to a data rate of the video input data; and
   transcoding the video input data using an open loop transcoder of the video processing device to generate a first decoded video data to generate a first decoded video data in response to determining the video input data is not to be scaled; and
   transcoding the video input data using a closed loop transcoder of the video processing device in response to determining the video input data is to be scaled, wherein transcoding the video input data using the closed loop transcoder comprises:
      using the first decoded video data and a second decoded video data to encode a first output video data; and
      using the first output video data and a third decoded video data to encode a second output video data.

18. A method comprising:
   receiving a first frame of video at an open loop transcoder of a video processing device;
   decoding, at the video processing device, the first frame of video to generate a first decoded video data;
   receiving a second frame of video at a closed loop transcoder of the video processing device;
   using the first decoded video data at the video processing device to determine a second decoded video data in response to determining the second frame is lossless transcoded; and
   disregarding the first decoded video data for use in determining the second decoded video data at the video processing device in response to determining the second frame of video is lossy transcoded.

* * * * *